(12) United States Patent
Krishnakumar et al.

(10) Patent No.: US 8,775,586 B2
(45) Date of Patent: Jul. 8, 2014

(54) GRANTING PRIVILEGES AND SHARING RESOURCES IN A TELECOMMUNICATIONS SYSTEM

(75) Inventors: Anjur Sundaresan Krishnakumar, Rocky Hill, NJ (US); Parameshwaran Krishnan, Basking Ridge, NJ (US); Venkatesh Krishnaswamy, Holmdel, NJ (US)

(73) Assignee: Avaya Inc., Basking Ridge, NJ (US)

( * ) Notice: Subject to any disclaimer, the term of this patent is extended or adjusted under 35 U.S.C. 154(b) by 892 days.

(21) Appl. No.: 11/239,494

(22) Filed: Sep. 29, 2005

(65) Prior Publication Data
US 2007/0073880 A1  Mar. 29, 2007

(51) Int. Cl.
*G06F 15/173*  (2006.01)

(52) U.S. Cl.
USPC .......................................... 709/223; 709/229

(58) Field of Classification Search
USPC .......... 709/217, 203, 223, 224, 229; 713/155, 713/156, 159, 165, 167, 168, 182; 726/1, 4, 726/8, 10
See application file for complete search history.

(56) References Cited

U.S. PATENT DOCUMENTS

| | | | |
|---|---|---|---|
| 5,081,667 A | | 1/1992 | Drori et al. |
| 5,684,869 A | | 11/1997 | Palumbo et al. |
| 5,684,950 A | * | 11/1997 | Dare et al. ...................... 726/10 |
| 5,790,646 A | | 8/1998 | Moon |
| 5,889,952 A | * | 3/1999 | Hunnicutt et al. ............. 709/219 |
| 5,974,133 A | | 10/1999 | Fleischer, III et al. |
| 6,122,631 A | * | 9/2000 | Berbec et al. .......................... 1/1 |
| 6,445,783 B1 | | 9/2002 | Creswell et al. |
| 6,510,523 B1 | * | 1/2003 | Perlman et al. ................... 726/6 |
| 6,768,792 B2 | | 7/2004 | Brown et al. |
| 6,941,552 B1 | | 9/2005 | Beadle et al. |
| 7,010,600 B1 | * | 3/2006 | Prasad et al. ................... 709/225 |

(Continued)

FOREIGN PATENT DOCUMENTS

| | | |
|---|---|---|
| CN | 1627683 A1 | 6/2005 |
| EP | 0720091 A2 | 7/1996 |

(Continued)

OTHER PUBLICATIONS

Chi, Fang, CN Application No. 200610141558.7 Office Action, Apr. 17, 2009, Published in: CN.

(Continued)

*Primary Examiner* — Lashonda Jacobs
(74) *Attorney, Agent, or Firm* — Kacvinsky Daisak Bluni PLLC; John Maldjian; Alexander D. Walter

(57) ABSTRACT

A method and an apparatus are disclosed that provide a privilege-granting technique for enabling a service-providing domain to grant a privilege to a requesting user in a service-requesting domain. A request handler in the service-providing domain, which comprises one or more service-associated resources, receives a user request to use a service and requests a token from a privilege-granting server, in accordance with the illustrative embodiment of the present invention. Upon receiving the token that specifies a granted privilege from the privilege-granting server, the request handler extends the privilege to the requesting user. Alternatively, the request handler can request a plurality of tokens in advance from the privilege-granting server; after receiving the tokens, the request handler extends a privilege to each requesting user as the handler receives requests to use one or more services.

28 Claims, 6 Drawing Sheets

(56) References Cited

U.S. PATENT DOCUMENTS

| | | | |
|---|---|---|---|
| 7,200,215 B2 | 4/2007 | Brown et al. | |
| 7,336,772 B1 | 2/2008 | Velusamy | |
| 7,437,755 B2 | 10/2008 | Farino et al. | |
| 7,444,666 B2* | 10/2008 | Edwards et al. | 726/1 |
| 7,616,748 B1 | 11/2009 | Katz | |
| 7,636,941 B2* | 12/2009 | Blinn et al. | 726/21 |
| 7,924,709 B2* | 4/2011 | Lynn | 370/230 |
| 7,949,114 B2* | 5/2011 | Kappes et al. | 379/189 |
| 8,220,032 B2* | 7/2012 | Brenneman et al. | 726/3 |
| 8,347,371 B2* | 1/2013 | Crespo et al. | 726/8 |
| 8,364,970 B2* | 1/2013 | Fu | 713/185 |
| 8,423,651 B1* | 4/2013 | Grieve et al. | 709/227 |
| 8,438,289 B1* | 5/2013 | Grieve et al. | 709/227 |
| 8,561,161 B2* | 10/2013 | Blakley et al. | 726/8 |
| 2002/0090073 A1 | 7/2002 | Heilmann et al. | |
| 2002/0181448 A1 | 12/2002 | Uskela et al. | |
| 2002/0184509 A1 | 12/2002 | Scheidt et al. | |
| 2003/0005118 A1* | 1/2003 | Williams | 709/225 |
| 2003/0005240 A1* | 1/2003 | Schroeder | 711/156 |
| 2004/0034774 A1* | 2/2004 | Le Saint | 713/169 |
| 2004/0086101 A1 | 5/2004 | Katz | |
| 2004/0128542 A1* | 7/2004 | Blakley et al. | 713/201 |
| 2004/0213172 A1 | 10/2004 | Myers et al. | |
| 2004/0260942 A1* | 12/2004 | Jamieson et al. | 713/201 |
| 2005/0021351 A1* | 1/2005 | Koskinen et al. | 705/1 |
| 2005/0187890 A1 | 8/2005 | Sullivan | |
| 2005/0198534 A1* | 9/2005 | Matta et al. | 713/201 |
| 2005/0254514 A1* | 11/2005 | Lynn | 370/450 |
| 2006/0154661 A1 | 7/2006 | Gonen et al. | |
| 2006/0177035 A1 | 8/2006 | Cope et al. | |
| 2006/0184646 A1* | 8/2006 | Schmidt et al. | 709/218 |
| 2006/0251230 A1 | 11/2006 | Tischler | |
| 2007/0036314 A1 | 2/2007 | Kloberdans et al. | |
| 2007/0136603 A1* | 6/2007 | Kuecuekyan | 713/185 |
| 2007/0169189 A1* | 7/2007 | Crespo et al. | 726/20 |
| 2007/0289006 A1* | 12/2007 | Ramachandran et al. | 726/10 |
| 2008/0282329 A1* | 11/2008 | Shuster | 726/4 |
| 2009/0259753 A1* | 10/2009 | Hinton et al. | 709/226 |
| 2011/0296522 A1* | 12/2011 | Speyer et al. | 726/20 |

FOREIGN PATENT DOCUMENTS

| | | |
|---|---|---|
| JP | H08-256371 | 10/1996 |
| JP | 2002132722 A | 5/2002 |
| JP | 2002-335239 | 11/2002 |
| JP | 2004310581 A | 11/2004 |
| WO | 03102754 A1 | 12/2003 |

OTHER PUBLICATIONS

Alonso Maleta, J., EP Application No. 06019673.0 Office Action Oct. 25, 2007, , Publisher: EPO, Published in: EP.

Alonso Maleta, J., EP Application No. 06019673 Search Report Feb. 13, 2007, , Publisher: EPO, Published in: EP.

Japanese Office Action for Patent Application No. 2006-266635, Avaya Technology LLC, for Granting Privileges and Sharing Resources in a Telecommunications System, dated Dec. 26, 2011, 6 pages.

Chi, Fang, CN Application No. 200610141558.7 Mar. 22, 2011, , Publisher: SIPO, Published in: CN.

Hongo, A., JP Application No. 2006-266635 Office Action Mar. 30, 2011, , Publisher: JPO, Published in: JP.

Hyam, Kristy, CA Application No. 2,558,616 Office Action Mar. 13, 2009, , Publisher: CIPO, Published in: CA.

Nash, Michael, EP Application No. 06019830.6-2414 Extended Search Report Feb. 13, 2007, , Publisher: EPO, Published in: EP.

Tieu, Binh Kien, U.S. Appl. No. 11/237,537 Office Action Jul. 21, 2010, , Publisher: USPTO, Published in: US.

Tieu, Binh Kien, U.S. Appl. No. 11/237,537 Panel Decision Apr. 26, 2010, , Publisher: USPTO, Published in: US.

Tieu, Binh Kien, U.S. Appl. No. 11/237,537 Office Action Dec. 21, 2009, , Publisher: USPTO, Published in: US.

Tieu, Binh Kien, U.S. Appl. No. 11/237,537 Office Action Sep. 3, 2009, , Publisher: USPTO, Published in: US.

Hongo, A., JP Application No. 2006-266635 Office Action Sep. 13, 2010, , Publisher: JPO, Published in: JP.

Tieu, Binh Kien, U.S. Appl. No. 11/237,537 Office Action Oct. 15, 2010, , Publisher: USPTO, Published in: US.

Chi Fang, CN Application No. 200610141558.7 Office Action Oct. 23, 2009, , Publisher: SIPO, Published in: CN.

A. Hongo, JP Application No. 2006-266635 Office Action Aug. 3, 2009, , Publisher: JPO, Published in: JP.

Nash, Michael, EP Application No. 06019830.6 Office Action Nov. 4, 2010, , Publisher: EPO, Published in: EP.

Tieu, Binh Kien, U.S. Appl. No. 11/237,537 Notice of Allowance Mar. 4, 2011, , Publisher: USPTO, Published in: US.

Tieu, Binh Kien, U.S. Appl. No. 11/237,537 Office Action Jan. 24, 2011, , Publisher: USPTO, Published in: US.

Japanese Patent Application No. 2006-266635, "Granting Privileges and Sharing Resources in a Telecommunication System," Avaya Inc., Office Action dated Mar. 8, 2013, 5 pgs.

European Communication for Patent Application No. 06019673.0, Avaya Technology LLC, for Granting Privileges and Sharing Resources in a Telecommunications System, dated Mar. 30, 2012, 5 pages.

* cited by examiner

GRANTING PRIVILEGES AND SHARING RESOURCES IN A TELECOMMUNICATIONS SYSTEM

FIELD OF THE INVENTION

The present invention relates to telecommunications in general, and, more particularly, to granting one or more privileges for the purpose of sharing one or more resources in a telecommunications system.

BACKGROUND OF THE INVENTION

FIG. 1 depicts a block diagram of telecommunications system 100 in the prior art. There are three types of data-processing systems that are present in telecommunications system 100: (i) those that use resources (i.e., user systems), (ii) the resources themselves, and (iii) the security systems that determine if the user systems may use the resources. System 100 comprises, interconnected as shown: (i) user 111, which is the user system; (ii) resources 114 and 124; and (iii) authentication servers 112 and 122, and ticket-granting servers 113 and 123, which are the security systems.

To determine if a user system may use a resource, such as one that is associated with a service, the user system has to be (i) authenticated and (ii) authorized to use the resource. Authentication is the process by which the security system verifies that a user system is what it is supposed to be. Authorization is the process by which the security system grants a privilege to the user system to go ahead and use the resource.

Authentication and authorization are well-understood processes in data communications, and many protocols exist in the prior art that provide a level of security through authentication or authorization, or both. Telecommunications system 100 uses one such protocol called Kerberos to determine whether to grant a privilege to user 111.

In a first example, user 111, a client machine, needs to use resource 114, a database server that is local to the client. Resource 114 contains sensitive information, so user 111 has to be first authenticated and authorized before it is allowed to use the resource. User 111 is authenticated by authentication server 112 through local area network 115 and is issued a "ticket" by ticket-granting server 113 to be used by the user for showing proof of identity to resource 114. User 111 presents the ticket to resource 114 and is then permitted to access the information stored on resource 114. The process is reasonably straightforward, partly because user 111 and resource 114 are local to each other and, as a result, are able to use the same authentication and authorization systems, namely authentication server 112 and ticket-granting server 113. In fact, user 111, servers 112 and 113, resource 114, and network 115 are said to be in their own Kerberos realm, which is depicted in FIG. 1 as realm 110, because of the common authentication server and ticket-granting server.

In a second example, user 111 now needs to use a different resource, resource 124, a database server that is distant from the client. Resource 124 also contains sensitive information, so user 111 has to be authenticated and authorized before it is allowed to user resource 124. However, resource 124 is in a different realm than that of user 111, in that access to resource 124 is controlled by a different security system than the one that is local to user 111. For this reason, resource 124 is considered to be in a different realm, depicted in FIG. 1 as realm 120, than that of user 111. To get a ticket for resource 124 in the different realm, user 111 has to request—from ticket-granting server 113—a ticket accepted by ticket-granting server 123. If distant ticket-granting server 123 has registered with local ticket-granting server 113, then server 113 gives user 111 a first ticket that is valid at server 123. User 111 presents the first ticket to server 123 via networks 115 and 125, and is then permitted to get a second ticket from server 123 to access the information stored on resource 124 (or to access other resources in realm 120).

The problem with the security protocol used by telecommunications system 100 is that it requires ticket-granting servers 113 and 123 to have a trust relationship, as indicated by association 130 in FIG. 1. That is, servers 113 and 123 must be aware of each other, must share information, and must trust each other with that information. However, the trust relationship can be difficult to manage and, in addition, is more than what is sufficient for some telecommunications systems.

SUMMARY OF THE INVENTION

The present invention provides a privilege-granting technique for enabling a service-providing domain to grant a privilege to a requesting user in a service-requesting domain. A request handler in the service-providing domain, which comprises one or more service-associated resources, receives a user request to use a service and requests a token from a privilege-granting server, in accordance with the illustrative embodiment of the present invention. Upon receiving the token that specifies a granted privilege from the privilege-granting server, the request handler extends the privilege to the requesting user. Alternatively, the request handler can request a plurality of tokens in advance from the privilege-granting server; after receiving the tokens, the request handler extends a privilege to each requesting user as the handler receives requests to use one or more services.

The privilege-granting technique in the illustrative embodiment is based on the realization that it is sufficient, in some telecommunications systems, to authenticate and authorize only the handler of service requests within the same domain as the resources associated with those services. It is unnecessary, in those telecommunications systems, also to have to authorize and authenticate the users in a different, service-requesting domain. As a result, in the technique of the illustrative embodiment, the two domains (i.e., service-requesting and service-providing) do not need to trust each other in the Kerberos sense.

Granting privileges based on the technique of the illustrative embodiment lends itself to various applications, particularly to Session Initiation Protocol (SIP)-based applications. New services such as SIP-based facsimile services, collect calling using SIP, and automatic receiver-controlled call redirection can use the disclosed technique advantageously over some techniques in the prior art.

The illustrative embodiment of the present invention comprises: receiving, in a service-providing domain, a request to use a service in the service-providing domain that is made by a first data-processing system in a service-requesting domain; transmitting a request for a token to a second data-processing system in the service-providing domain, wherein the second data-processing system is unaware of the identity of the first data-processing system; and receiving the token wherein the token specifies a granted privilege.

DETAILED DESCRIPTION

For the purposes of this specification and claims, the term "domain" is defined as a group of data-processing systems that share a common communications address. A service-requesting domain, for example, is the domain in which the user data-processing systems that request to use one or more services are found. A service-providing domain is the domain in which the resources that are associated with those requested services are found, along with data-processing systems that control the access to those resources.

Figure 1:
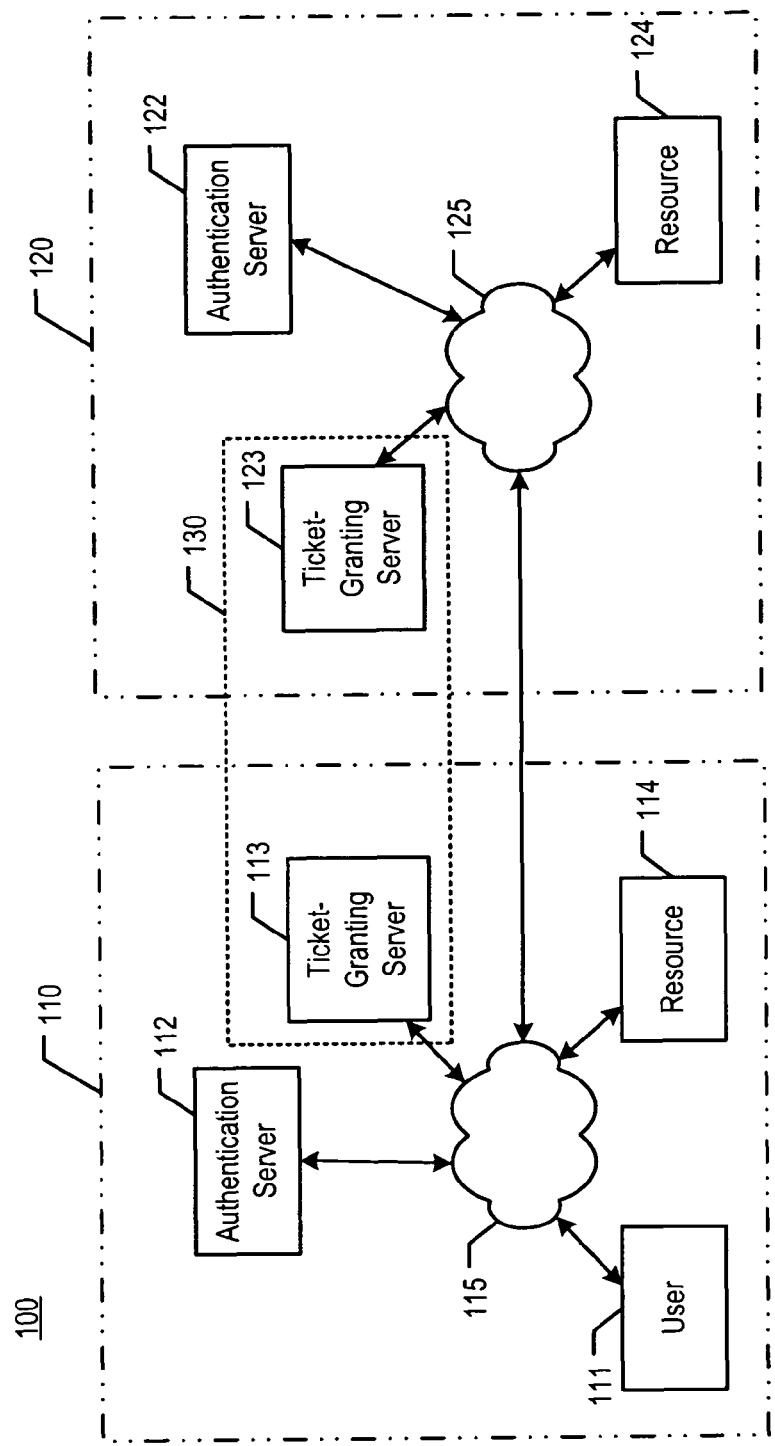
FIG. 1 depicts a block diagram of telecommunications system 100 in the prior art.
Figure 2:
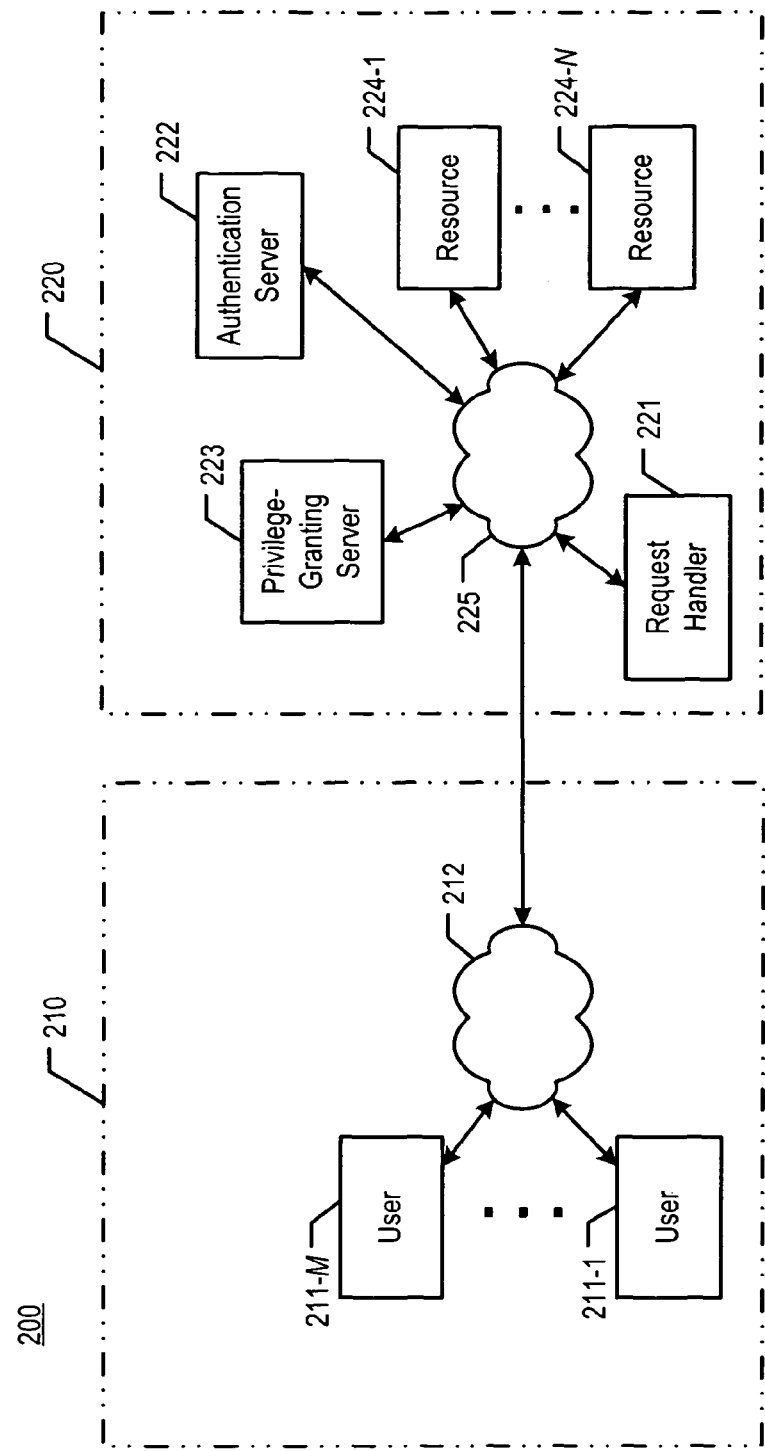
FIG. 2 depicts a block diagram of telecommunications system 200, in accordance with the illustrative embodiment of the present invention.

FIG. 2 depicts a block diagram of telecommunications system 200, in accordance with the illustrative embodiment of the present invention. Telecommunications system 200 comprises users 211-1 through 211-M, wherein M is a positive integer; local area network 212; request handler 221; authentication server 222; privilege-granting server 223; resources 224-1 through 224-N, wherein N is a positive integer; and local area network 225, interconnected as shown.

Telecommunications system 200 comprises two domains: service-requesting domain 210 and service-providing domain 220. Users 211-1 through 211-M and local area network 212 constitute service-requesting domain 210. Request handler 221, authentication server 222, privilege-granting server 223, resources 224-1 through 224-N, and local area network 225 constitute service-providing domain 220. A trust relationship is non-existent between service-requesting 210 and service-providing 220, at least during some periods. Furthermore, in some embodiments, service-providing domain 220 withholds the identity of privilege-granting server 223 from requesting user 211-m, wherein m has a value of between 1 and M, inclusive. In addition, in some embodiments, service-providing domain 220 withholds the identities of one or more of resources 224-1 through 224-N from requesting user 211-m.

User 211-m is a data-processing system in service-requesting domain 210 that is capable of making a request for a service that is available in service-providing domain 220. Furthermore, user 211-m is capable of using the service, once service-providing domain 220 has granted user 211-m a privilege to use the service. A human user operates user 211-m to request and use the service. For example, user 211-m might be a personal computer or a telecommunications terminal that is capable of sending and receiving voice or data traffic. In some alternative embodiments, user 211-m might not be serving any human user. As those who are skilled in the art will appreciate, users 211-1 through 211-M can all be in the same service-requesting domain, as in the illustrative embodiment, or can be separated across two or more service-requesting domains.

User 211-m communicates with data-processing systems in service-providing domain 220 through local area network 212, in well-known fashion. It will be clear to those skilled in the art how to make and use user 211-m.

Request handler 221 is a data-processing system that receives requests from service-requesting domain 210 to use one or more services and acts on behalf of users in domain 210 to process those requests. In accordance with the illustrative embodiment, request handler 221 communicates with users 211-1 through 211-M via the Session Initiation Protocol; however, it will be appreciated that handler 221 can communicate with via another set of protocols (e.g., H.323, etc.). Handler 221 interacts with authentication server 222, privilege-granting server 223, and one or more of resources 224-1 through 224-N in the course of processing a either a past or a future request from a user. Handler 221 communicates with the other elements of service-providing domain 220 via local area network 225 in well-known fashion. The salient components of handler 221 are described below and with respect to FIG. 3. Handler 221 executes the relevant tasks that are described below and with respect to FIGS. 4 and 5, in accordance with the illustrative embodiment of the present invention.

Authentication server 222 is a system that authenticates request handler 221 as needed, in well-known fashion. Server 222 can either receive an authentication request directly from handler 221 or receive a request to authenticate handler 221 from privilege-granting server 223. As those who are skilled in the art will appreciate, server 222 may use one of the many known techniques to authenticate handler 221. It will be clear to those skilled in the art how to make and use authentication server 222.

Privilege-granting server 223 is a data-processing system that grants privileges to use one or more services that involve using one or more of resources 224-1 through 224-N, in accordance with the illustrative embodiment of the present invention. Server 223 receives a request for one or more tokens from handler 221, wherein each token provides information that is related to a granted privilege, including the granting of a privilege itself. Server 223 might require handler 221 to authenticate with authentication server 222, if handler 221 has not already done so. Although privilege-granting server 223 is aware of the identity of handler 221, the server does not need to know the identity of the user that is making the request for service.

Server 223 generates one or more tokens and sends them to handler 221, thereby authorizing handler 221 to provide access for each granted privilege. Server 223 is also responsible for setting up the necessary environment within service-providing domain 220 to accept and process the user's subsequent signals from service-requesting domain 210. In addition, server 223 extends the granted privilege to the requesting user, (i.e., user 211-m). It will be clear to those skilled in the art, after reading this specification, how to make and use privilege-granting server 223.

Resource 224-n, wherein n has a value of between 1 and N, inclusive, is a resource that is associated with a service. Resource 224-n can be a standalone device, a part of another device, a software entity, and so forth. For example, resource 224-n can be a database, printer, a port or rule in a firewall, a conference bridge, and so forth. It will be clear to those skilled in the art how to make and use resource 224-n.

Request handler 221, together with privilege-granting server 223, determine which of resources 224-1 through 224-N are required as part of the requested service. For example, if the requested service provides for the processing of a facsimile transmission from user 211-1 for a particular recipient who is near fax printer resource 224-3, then handler 221 and server 223 would determine that a fax printer is required and that resource 224-3 is the fax printer that is closest to the recipient; handler 221 would indicate this to the user.

Figure 3:
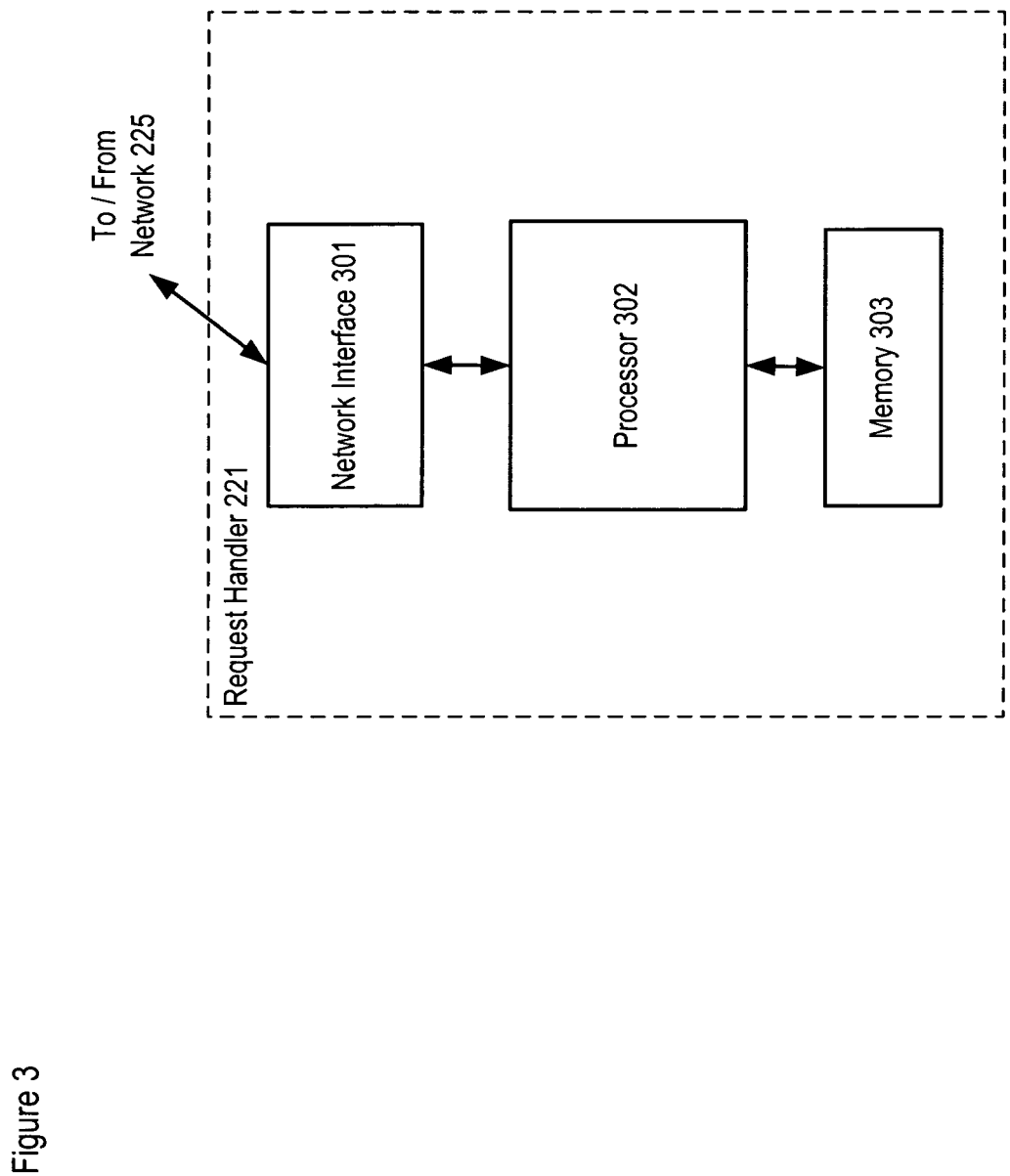
FIG. 3 depicts a block diagram of the salient components of request handler 221, in accordance with the illustrative embodiment of the present invention.

FIG. 3 depicts a block diagram of the salient components of request handler 221 in accordance with the illustrative embodiment of the present invention. Request handler 221 comprises network interface 301, processor 302, and memory 303, interconnected as shown.

Network interface 301 comprises a receiving part and a transmitting part. The receiving part receives signals from other data-processing systems in telecommunications system 200 and forwards the information encoded in the signals to processor 302, in well-known fashion. The transmitting part receives information from processor 302, and outputs packet-related signals that encode this information to another data-processing system, in well-known fashion. It will be clear to those skilled in the art how to make and use network interface 301.

Processor 302 is a general-purpose processor that is capable of receiving information from network interface 301; reading data from and writing data into memory 303; executing the tasks described below and with respect to FIGS. 4 and 5; and transmitting information to network interface 301. In some alternative embodiments of the present invention, processor 302 might be a special-purpose processor. In either case, it will be clear to those skilled in the art, after reading this disclosure, how to make and use processor 302.

Memory 303 stores data and executable instructions, in well-known fashion. It will be clear to those skilled in the art how to make and use memory 303.

Figure 4:
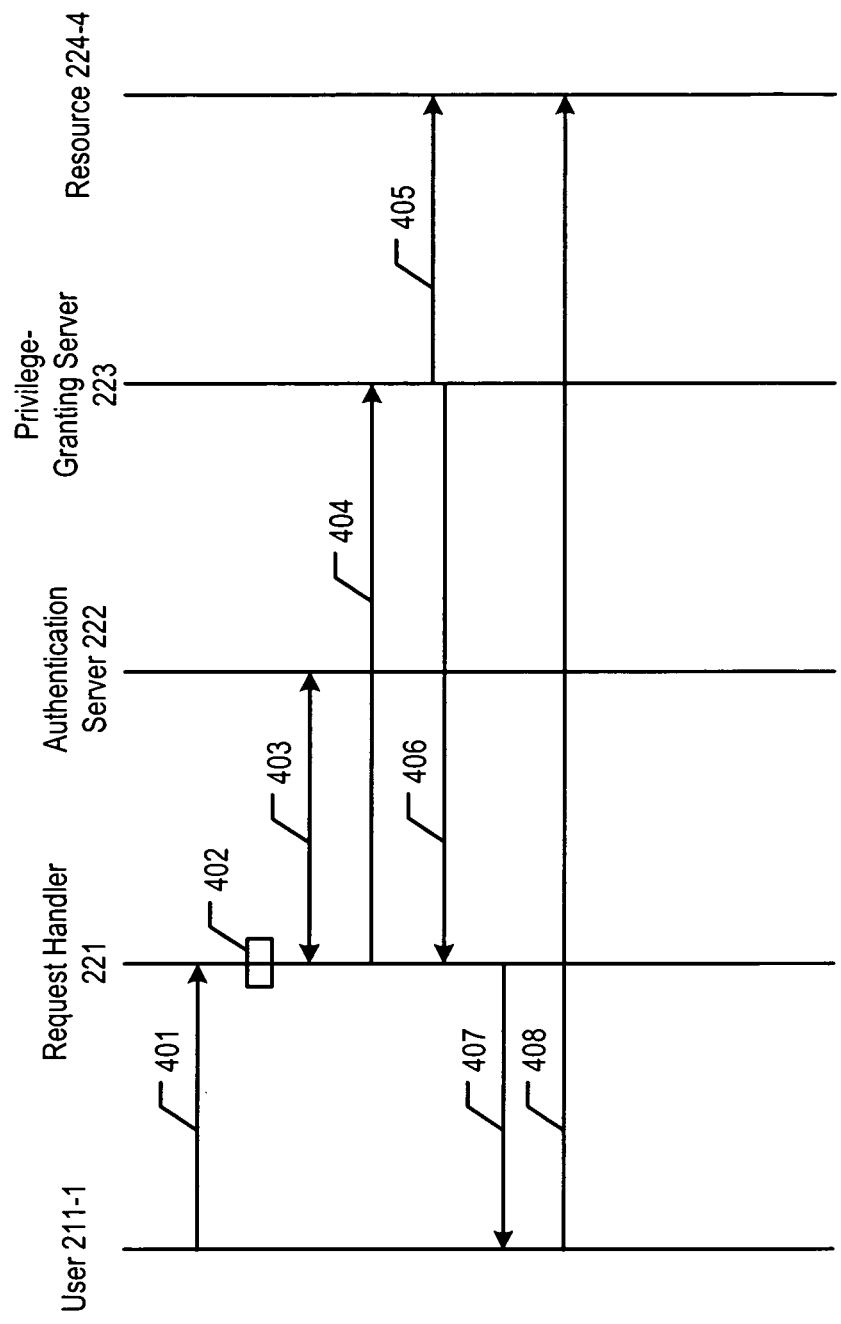
FIG. 4 depicts a first message flow diagram related to telecommunications system 200.

FIG. 4 depicts a first message flow diagram related to telecommunications system 200, in accordance with the illustrative embodiment of the present invention. The message flow diagram illustrates a sequence that begins with user 211-1, a first data-processing system in service-requesting domain 210, requesting to use a service that is in service-providing domain 220. It will be clear to those skilled in the art which events depicted in FIG. 4 can be performed simultaneously or in a different order than that depicted.

Through message 401, request handler 221 receives a request transmitted by user 211-1 to use a service in service-providing domain 220. The request includes some preliminary information that is used by request handler 221 to identify and process the request.

At event 402, request handler 221 decides whether to accept the request, based partly on the preliminary information in the request. If it accepts the request, handler 221 then determines whether it needs to authenticate itself with authentication server 222. In some embodiments, request handler 221 also determines which of resources 224-1 through 224-N are needed, based on the particular service that user 211-1 is requesting to use.

If request handler 221 needs to authenticate itself, it performs authentication sequence 403 with authentication server 222, in well-known fashion. Authentication sequence 403 does not involve service-requesting domain 210, as the authentication is for request handler 221 and not for user 211-1.

Having authenticated successfully, as part of message 404, request handler 221 transmits a request for a token; it transmits the request to privilege-granting server 223, a second data-processing system. In some embodiments, handler 221 also determines which resources are associated with the requested service and transmits information about those resources as part of the request to server 223.

Privilege-granting server 223 determines which resources are needed for the requested service, either autonomously or with input from handler 221. Depending on the selected resource, in some embodiments, privilege-granting server 223 transmits message 405 to set up the selected resource's environment—in this case, that of resource 224-4—to accept user 211-1's request for service.

Server 223 also generates a token that specifies a granted privilege, such as using one or more resources for a specified purpose. In some embodiments, the granted privilege is for a time-limited use of the resource. For example, the time-limited use might be a single use only. As part of message 406, server 223 transmits the token, which is received by request handler 221. At this point, request handler 221 is authorized to extend the granted privilege specified by the token.

Through message 407, request handler 221 extends to user 211-1 the granted privilege that it received as part of the token. In addition, handler 221 forwards information to user 211-1 on how to access the resource associated with the requested service, in this case resource 224-4.

User 211-1 then utilizes the information forwarded by handler 221 to use the requested service by transmitting message 408 to resource 224-4.

Figure 5:
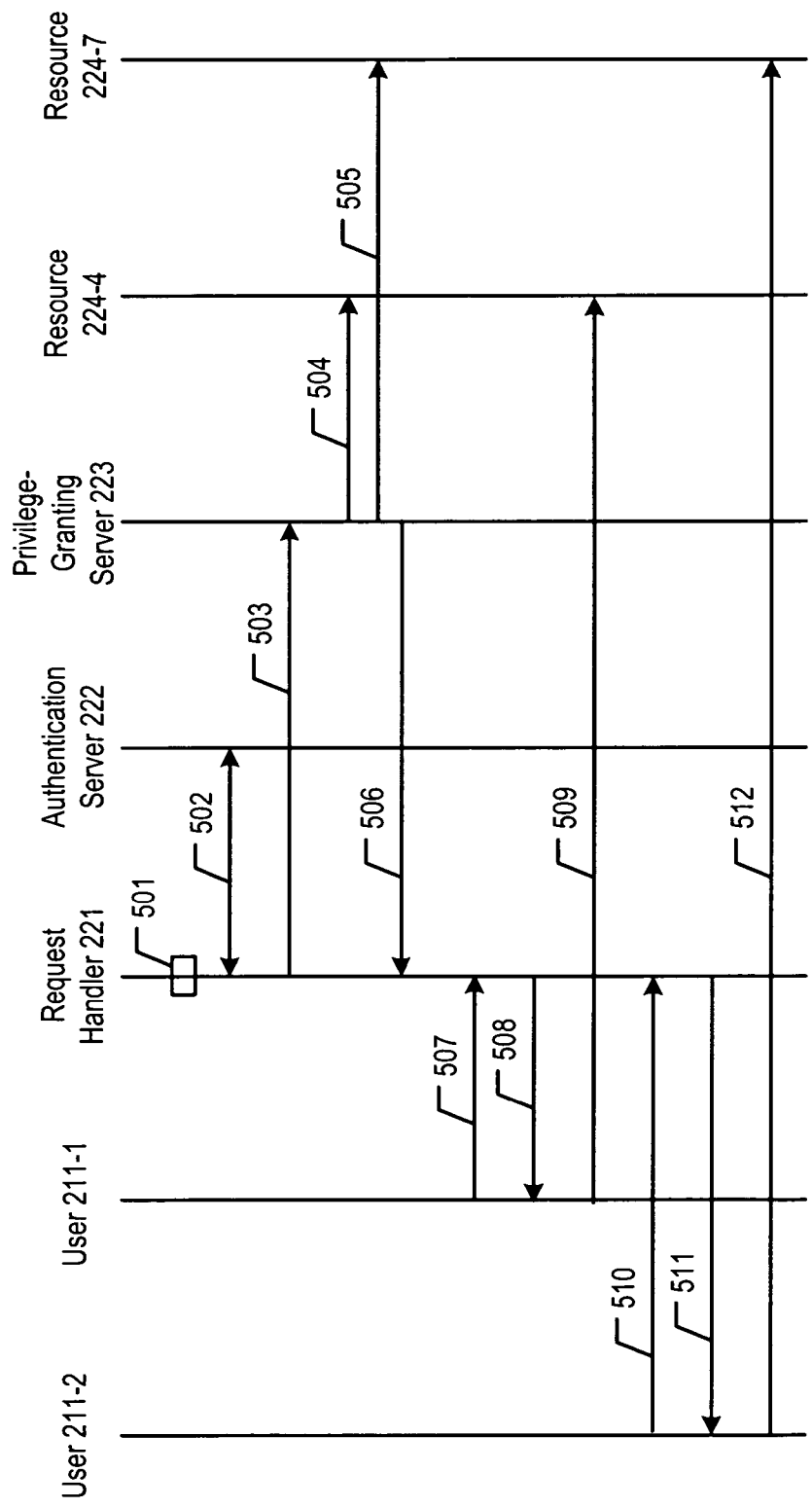
FIG. 5 depicts a second message flow diagram related to telecommunications system 200.

FIG. 5 depicts a second message flow diagram related to telecommunications system 200, in accordance with the illustrative embodiment of the present invention. The message flow diagram illustrates a sequence that begins with request handler 221 requesting one or more tokens from. privilege-granting server 223, to be used later in processing service requests from one or more of users 211-1 through 211-M. It will be clear to those skilled in the art which events depicted in FIG. 5 can be performed simultaneously or in a different order than that depicted.

At event 501, request handler 221 prepares to request one or more tokens from privilege-granting server 223. Handler 221 determines whether it needs to authenticate itself with authentication server 222. In some embodiments, request handler 221 also determines which of resources 224-1 through 224-N are needed, based on the requests to use one or more services that handler 221 anticipates receiving from one or more users (e.g., user 211-1, user 211-2, etc.).

If request handler 221 needs to authenticate itself, it performs authentication sequence 502 with authentication server 222, in well-known fashion. Authentication sequence 502 does not involve service-requesting domain 210, as the authentication is for request handler 221 and not for user 211-1 or 211-2.

Having authenticated successfully, as part of message 503, request handler 221 transmits a request for one or more tokens; it transmits the request to privilege-granting server 223. In some embodiments, handler 221 also determines which resources are associated with the services that it anticipates being requested and transmits information about those resources as part of the request to server 223.

Privilege-granting server 223 determines which resources are needed for the services associated with the anticipated requests, either autonomously or with input from handler 221. Depending on the selected resource, in some embodiments, privilege-granting server 223 transmits messages 504 and 505 to set up the selected resources' environments—in this case, those of resources 224-4 and 224-7—to accept future requests for service.

Server 223 also generates one or more tokens, wherein each generated token specifies a granted privilege, such as a use of one or more resources for a specified purpose. In some embodiments, the granted privilege is for a time-limited use of the associated resource. For example, the time-limited use might be a single use only. As part of message 506, server 223 transmits the tokens, which are received by request handler 221. At this point, request handler 221 is authorized to extend the granted privilege specified by each received token to each user that subsequently requests to use a service.

Request handler 221, through message 507, eventually receives a request transmitted by user 211-1 to use a service in service-providing domain 220. The request includes some preliminary information that is used by request handler 221 to identify and process the request.

Through message 508, request handler 221 extends to user 211-1 the granted privilege that it received from privilege-granting server 223 as part of one of the tokens. In addition, handler 221 forwards information to user 211-1 on how to access the resource associated with the requested service, in this case resource 224-4.

User 211-1 then utilizes the information forwarded by handler 221 to use the requested service by transmitting message 509 to resource 224-4.

Eventually, through message 510, request handler 221 receives a request transmitted by a different user than before, namely user 211-2, to use a different service than before in service-providing domain 220. The request includes some preliminary information that is used by request handler 221 to identify and process the request. Although the provided example depicts requesting to use a different service than before, it will be appreciated that request handler 211 can process requests from different users for the same service.

Through message 511, request handler 221 extends user 211-2 the granted privilege that it received from privilege-granting server 223 as part of one of the tokens. In addition, handler 221 forwards information to user 211-2 on how to access the resource associated with the requested service, in this case resource 224-7.

User 211-2 then utilizes the information forwarded by handler 221 to use the requested service by transmitting message 512 to resource 224-7.

Figure 6:
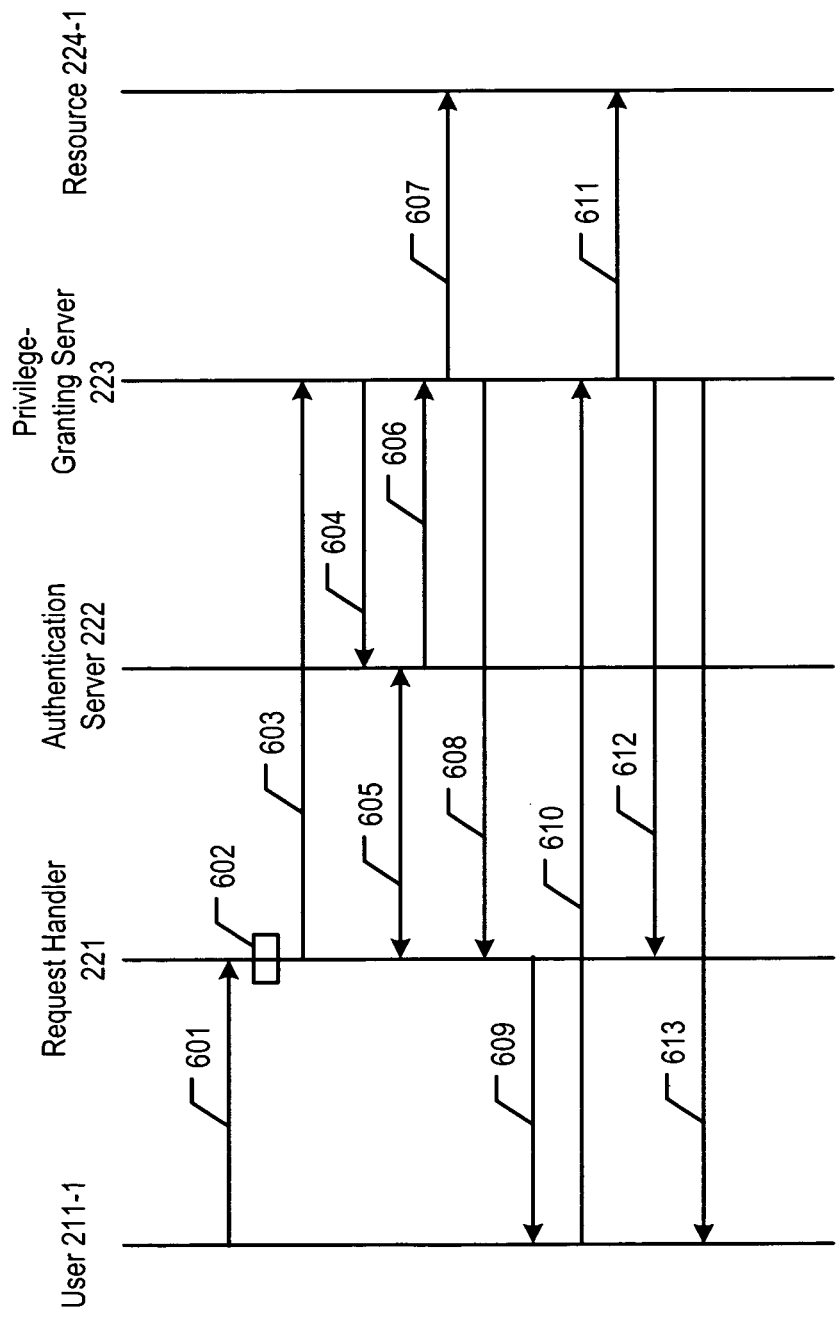
FIG. 6 depicts a third message flow diagram related to telecommunications system 200.

Some applications that utilize the technique in the illustrative embodiment are now disclosed. A first application that utilizes the privilege-granting technique of the illustrative embodiment—Facsimile Service using Session Initiation Protocol—is disclosed here, the message flow of which is depicted in FIG. 6. The message flow diagram illustrates a sequence in which user 211-1 requests that a facsimile be sent to a printer that is near the recipient in service-providing domain 220.

In this application, privilege-granting server 223 functions as a facsimile server and for reasons of clarity is referred to in the description as "fax server 223." The functionality associated with authentication server 222 can be provided by the enterprise's user authentication engine, such as Windows domain authentication. The resource that is associated with the service, resource 224-1, is the printer at which the facsimile file is to be received.

Referring to FIG. 6, through message 601, request handler 221 receives a request transmitted by user 211-1 to receive a facsimile in service-providing domain 220. The request, which can be part of a SIP INVITE message, includes some information about the facsimile being sent (e.g., number of pages, format of transmission, a preview of the first page, etc.).

At event 602, request handler 221 decides whether to accept the request based on the information provided in the request. If it accepts the request, handler 221 then determines whether it needs to authenticate itself with authentication server 222. In some embodiments, request handler 221 also determines which of resources 224-1 through 224-N are needed, based on the particular service that user 211-1 is requesting to use.

Through message 603, request handler 221 transmits a request for a token; it transmits the request to fax server 223. Via message 605, fax server 223 then requests that authentication server 222 (or its functional equivalent) authenticate request handler 221.

Server 222 performs authentication sequence 605 with request handler 221, in well-known fashion (e.g., via domain controller authentication, etc.). Server 222, via message 606, provides fax server 223 with the authentication results. Alternatively, request handler 221, instead of fax server 223, could have contacted server 222 to authenticate the request handler, as described with respect to FIGS. 4 and 5.

Fax server 223 determines which printer is closest to the recipient of the facsimile; resource 224-1 turns out to be the closest printer. Fax server 223, if necessary, transmits message 607 to resource 224-1 to prepare the printer.

Fax server 223 also generates a token, which in this case is a cookie, based on the identities of request handler 221 and user 211-1 (i.e., the sender of the fax), as well as other relevant information such as the printer to be used. The token specifies the granted privilege of using the identified printer for the fax transmission. In some embodiments, the granted privilege is for a time-limited use of the resource. For example, the time-limited use might be a single use only. As part of message 608, fax server 223 transmits the token, which is then received by request handler 221. At this point, request handler 221 is authorized to extend the granted privilege specified by the token.

Through message 609, which can be a SIP REDIRECT message, request handler 221 extends to user 211-1 the granted privilege that it received as part of the token. In addition, handler 221 forwards information to user 211-1 on how to access the printer.

Via message 610, user 211-1 utilizes the information forwarded by handler 221 to transfer the file that contains the printing information (e.g., in postscript format, in PDF format, etc.), along with the cookie to fax server 223.

Fax server 223 then completes the transaction by sending the document file to the printer (i.e., resource 224-1). Server 223 sends a status to request handler 221 that indicates the delivery of the fax and the location of the printer; the status is sent via message 612, which can be a SIP Instant Message. Request handler 221 can then notify the human recipient of the status. Fax server 223 also sends confirmation message 613 to user 211-1, indicating that the fax has been delivered to the printer.

A second application that utilizes the privilege-granting technique of the illustrative embodiment—Collect Calls using Session Initiation Protocol—is disclosed here. As those who are skilled in the art will appreciate, related features such as third-party billing can be similarly implemented. The message flows in this application closely resemble those depicted in FIG. 6, with some additional considerations. For example, in this collect call application, user 211-1 requests to reverse the charges for a call to be made to a recipient in service-providing domain 220, which represents the service provider of the recipient of the collect call. In addition, server 223 functions as the call collect-server of the recipient's service provider and is referred to in the description as "call collect server 223." Another difference is that the resource that is associated with the service, resource 224-1, comprises a port or rule in a firewall, as well as the ability to add a call detail record for billing purposes.

As shown in FIG. 6, the caller (i.e., user 211-1) transmits SIP INVITE message 601 to request handler 221, indicating the request to have the charges reversed. If the request is acceptable, which is determined at event 602, request handler 221 contacts call collect server 223 via message 603. Server 223 might require that request handler 221 authenticate with authentication server 222 and indicates this via message 604. Authentication server 222 can request a personal identification number and password from request handler 221 via authentication sequence 605, as part of the authenticating process.

Once the authentication has completed and server 222 has provided call collect server 223 with the results via message 606, server 223 activates a port or rule at resource 224-1 (i.e., the firewall) via message 607 to allow the data traffic associated with the call to flow.

As part of message 608, server 223 transmits the generated token, which is received by request handler 221. At this point, request handler 221 is authorized to extend the granted privilege specified by the token to proceed with the collect call.

Through message 609, which can be a SIP REDIRECT message, request handler 221 extends to user 211-1 the granted privilege that it received as part of the token. In addition, handler 221 forwards information to user 211-1 on how to route the call traffic.

Via message 610, user 211-1 uses the information forwarded by handler 221 to route the call traffic to the recipient through server 223.

A third application that utilizes the privilege-granting technique of the illustrative embodiment—Automatic Receiver-Based Redirection to a Conference Bridge—is disclosed here. The message flows in this application closely resemble those depicted in FIG. 6, with some additional considerations. For example, in this conference bridge application, user 211-1 requests to be added to a conference bridge in service-providing domain 220, which represents the service provider of the conference bridge. Request handler 221 serves as the host of the conference call; as the host, handler 221 sets up a pre-approved list of participants, sets up a policy of allowing access to everybody who calls, or maintains an explicit "allow/deny" list. The "authentication server 222" function can be bundled in with the conference bridge software. In addition, server 223 functions as the conferencing server of the service provider and is referred to in the description as "call conferencing server 223." Another difference is that the resource that is associated with the service, resource 224-1, is the conference bridge itself (i.e., equipment or software, or both).

As shown in FIG. 6, the caller (i.e., user 211-1) transmits SIP INVITE message 601 to request handler 221, indicating the request to be added to the conference bridge. If the request is acceptable, which is determined at event 602, request handler 221 contacts call conferencing server 223 via message 603. Server 223 might require that request handler 221 authenticate with the authentication function (i.e., "server 222") and indicates this via message 604. The authentication function authenticates the host (i.e., handler 221) via sequence 605 and allows the host to set the conferencing policy or list of participants, either as each participant calls or in advance of the conference call (as in the message flow that was described earlier and with respect to FIG. 5).

Once the authentication has completed and server 222 has provided call conferencing server 223 with the results via message 606, server 223 enables resource 224-1, which is the conference bridge, via message 607 if needed.

As part of message 608, server 223 transmits the generated token (e.g., a one-time password, etc.), which is received by request handler 221. At this point, request handler 221 is authorized to extend the granted privilege specified by the token to proceed with bridging in user 211-1.

Through message 609, which can be a SIP REDIRECT message, request handler 221 extends to user 211-1 the granted privilege that it received as part of the token. In addition, handler 221 forwards to user 211-1 the received one-time password and information on how to route the call traffic to the bridge.

Via message 610, user 211-1 uses the password to log onto the conference bridge and the forwarded information to route the call traffic through the bridge. Note that the conference bridge service can still use a login procedure to authenticate each caller, in addition to having authenticated request handler 221. In this third application, however, the bridge number and password are sent to each caller by using the privilege-granting technique in the illustrative embodiment and do not have to be disseminated in advance. The agents at the end terminals perform the authentication and logging onto the bridge without the human user's explicit involvement.

The third application can be alternatively enabled by applying the message flows that are described with respect to FIG. 5 (instead of FIG. 6, as described immediately above). In this variation of the Redirection to a Conference Bridge application, request handler 221 (i.e., the host of the conference call) obtains in advance of a conference call the appropriate number of tokens for the expected number of participants. Then, as each participant dials into the conference call, request handler 221 extends to the participant the granted privilege that handler 221 received from server 223 as part of the tokens. In addition, handler 221 forwards to the participant the received one-time password and information on how to route the call traffic to the bridge.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:
1. A method comprising:
receiving, in a service-providing domain, a request to use a service in said service-providing domain that is made by a first data-processing system in a service-requesting domain;

transmitting a request for a token to a second data-processing system in said service-providing domain, wherein said second data-processing system is unaware of the identity of said first data-processing system;

receiving said token wherein said token specifies a granted privilege; and extending said granted privilege to said first data-processing system, wherein a domain comprises a group of data-processing systems that share a common communications address, and wherein the common communications address of the service-providing domain is independent of the common communications address of the service-requesting domain.

2. The method of claim 1 wherein said granted privilege is for a time-limited use of at least one resource that is associated with said service.

3. The method of claim 2 wherein said time-limited use is a single use of said at least one resource.

4. The method of claim 1 further comprising determining, based on the reception of said request to use said service, at least one resource that is associated with said service, wherein said request for said token specifies said at least one resource.

5. The method of claim 1 further comprising receiving, from said second data-processing system, a message that is related to an authentication, wherein said authentication involves said service-providing domain, but not said service-requesting domain.

6. The method of claim 1 wherein a trust relationship is nonexistent between said service-requesting domain and said service-providing domain at the time of the reception, in said service-providing domain, of said request to use said service.

7. The method of claim 6 wherein said service-providing domain withholds, from said first data-processing system, the identity of said second data-processing system.

8. The method of claim 6 wherein said service-providing domain withholds, from said first data-processing system, the identity of at least one resource that is associated with said service.

9. The method of claim 1 further comprising informing said first data-processing system how to access at least one resource that is associated with said service.

10. The method of claim 1 wherein the extending of granted privilege to said first data-processing system is accomplished by transmitting at least one encrypted message.

11. The method of claim 1 wherein said request to use said service is received and said granted privilege is extended in accordance with the Session Initiation Protocol.

12. The method of claim 1 wherein said service comprises the receiving of a facsimile transmission from said first data-processing system.

13. A method comprising:

receiving, in a service-providing domain, a request to use a service in said service-providing domain that is made by a first data-processing system in a service-requesting domain;

transmitting a request for a token to a second data-processing system in said service-providing domain;

receiving said token, wherein said token specifies a granted privilege that is for a time-limited use of at least one resource that is associated with said service; and extending said granted privilege to said first data-processing system, wherein a trust relationship is nonexistent between said service-requesting domain and said service-providing domain at the time of the reception, in said service-providing domain, of said request to use said service, wherein a domain comprises a group of data-processing systems that share a common communications address, and wherein the common communications address of the service-providing domain is independent of the common communications address of the service-requesting domain.

14. The method of claim 13 wherein said time-limited use is a single use of said at least one resource.

15. The method of claim 13 further comprising determining, based on the reception of said request to use said service, at least one resource that is associated with said service, wherein said request for said token specifies said at least one resource.

16. The method of claim 13 further comprising receiving, from said second data-processing system, a message that is related to an authentication, wherein said authentication involves said service-providing domain, but not said service-requesting domain.

17. The method of claim 13 wherein said service-providing domain withholds, from said first data-processing system, the identity of at least one resource that is associated with said service.

18. The method of claim 13 further comprising informing said first data-processing system how to access at least one resource that is associated with said service.

19. The method of claim 13 wherein said request to use said service is received and said granted privilege is extended in accordance with the Session Initiation Protocol.

20. A method comprising:

transmitting, to a second data-processing system in a service-providing domain, a request for a plurality of tokens, wherein said second data-processing system is unaware of the identity of a first data-processing system in a service-requesting domain, and wherein said first data-processing system is capable of using a first service in said service-providing domain;

receiving said plurality of tokens, wherein a first token of said plurality of tokens specifies a first granted privilege; and extending, to said first data-processing system, said first granted privilege that is associated with said first service, wherein a domain comprises a group of data-processing systems that share a common communications address, and wherein the common communications address of the service-providing domain is independent of the common communications address of the service-requesting domain.

21. The method of claim 20 wherein said first granted privilege is for a time-limited use of at least one resource that is associated with said first service.

22. The method of claim 21 wherein said time-limited use is a single use of said at least one resource.

23. The method of claim 20 wherein a trust relationship is nonexistent between said service-requesting domain and said service-providing domain at the time of the transmission of said request for said plurality of tokens.

24. The method of claim 20 further comprising determining at least one resource that is associated with said first service, wherein said request for said plurality of tokens specifies said at least one resource.

25. The method of claim 20 further comprising extending, to a third data-processing system in said service-requesting domain, a second granted privilege that is associated with a second service;

wherein a second token of said plurality of tokens specifies said second granted privilege; and wherein said second data-processing system is unaware of the identity of said third data-processing system.

26. The method of claim 25 wherein said first granted service and said second granted service are the same.

27. The method of claim 20 wherein said first service comprises the receiving of a facsimile transmission from said first data-processing system.

28. The method of claim 20 wherein said first granted privilege is extended in accordance with the Session Initiation Protocol.

* * * * *